E. HENNEBERY.
SHEER-BOOM.

No. 184,868.     Patented Nov. 28, 1876.

WITNESSES.     INVENTOR.

UNITED STATES PATENT OFFICE.

EDWARD HENNEBERY, OF EAU CLAIRE, WISCONSIN.

IMPROVEMENT IN SHEER-BOOMS.

Specification forming part of Letters Patent No. 184,868, dated November 28, 1876; application filed October 21, 1876.

*To all whom it may concern:*

Be it known that I, EDWARD HENNEBERY, of Eau Claire, in the county of Eau Claire and State of Wisconsin, have invented certain new and useful Improvements in Sheer-Boom; and I do hereby declare the following to be a full, clear, and exact description of the invention, such as will enable others skilled in the art to which it pertains to make and use it, reference being had to the accompanying drawings, which form part of this specification.

My invention relates to an improvement in sheer-booms; and it consists in the arrangement and combination of parts, that will be more fully described hereinafter, whereby the logs may be collected or turned to any one point, and the necessity for the great power heretofore required for operating such booms, and the consequent danger to life, is dispensed with.

It also consists in the use of an angular piece on the front of the boom, for the purpose of dividing the current and preventing the logs from diving downward as they strike the boom.

Figure 1:
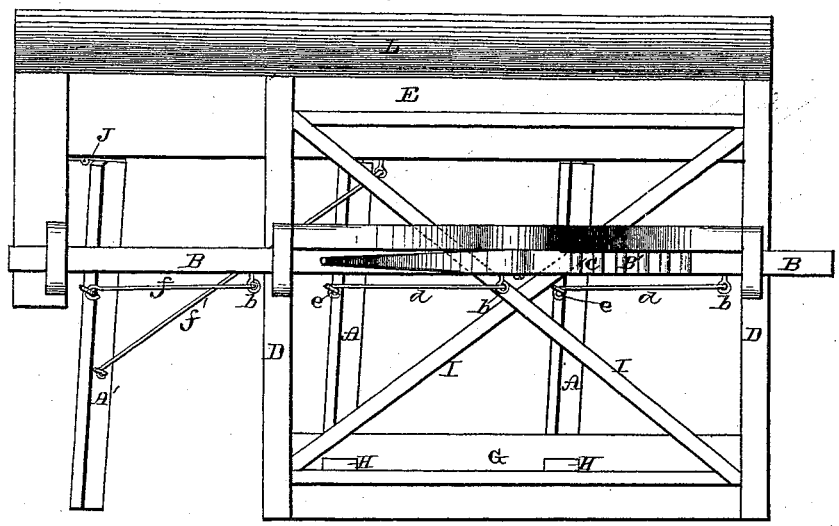
Figure 2:
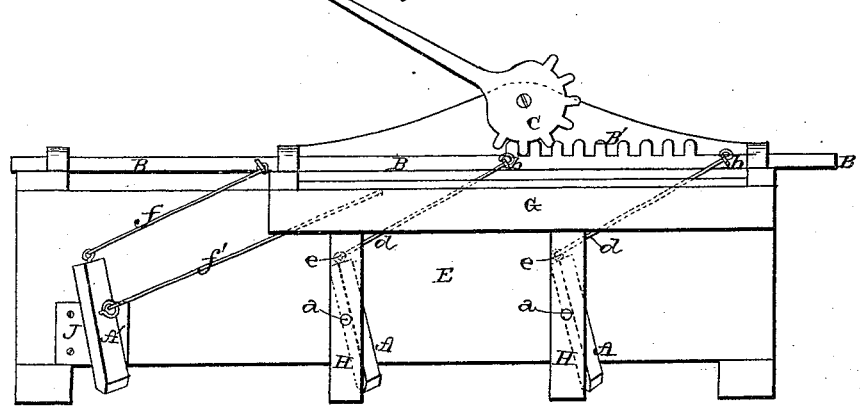
Figure 3:
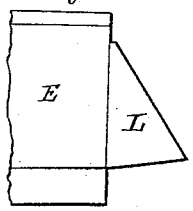

Figure 1 is a plan view of my invention. Fig. 2 is a side elevation of the same, and Fig. 3 a detail view.

A represents the sheer-blades, which are pivoted on their centers, and the water thus offers no resistance to their movements. The pivot *a* may be made of cast-iron or wood. If made of cast-iron it should be provided with a flange extending above and below it, to be fastened to the flat of the blade. Moving back and forth on rollers in suitable guides on the timbers D, that extend horizontally outward from the main boom E, is the bar B, which has a rack, B′, formed on its top, for engaging with the wheel or lever C, and by means of which lever the bar and the blades are operated. Connected to this bar, by means of the eyebolts *b e* and the rods *d*, are the blades A, the said rods being attached to the top edges of the blades, so as to make them stand vertically or lie horizontally.

The rear ends of the timbers D are secured to the beam G, and then are braced firmly in position by the braces I. From the beam G depend the hangers H, which form the bearings for the blades A, there being a hanger for each blade. This whole back part of the boom is made to float lightly on the stream, so as not to offer any resistance to the action of the water on the blades. On the front of the boom is secured the angular piece L, which divides the current and changes its action. In a stiff current, with the square boom now in use, offering a flat surface to the current, as the logs strike it they are carried downward and under by the action of the current; but with this angular piece L, when the ends of the logs strike the boom they are raised upward, instead of carried under, and can thus be kept in front of the boom as long as may be desired. Another advantage is, that the under-tow is removed, and a greater current is created along the side of the boom.

The wooden bar B, which is made square, and locked, spiked, and riveted together at the joints, is a substitute for the ropes at present in use. By the construction above described this rod can be operated with great ease and rapidity.

Substantially this invention can be applied to the booms now in use, in which case the blade A′ is pivoted at its front end to the hinge J, and held by a brace, *f*, and rod *f*′. This brace may be attached to another wooden rod, and, when the blade is thrown flat on the water, can be operated back and forth on the hinge by a cog-wheel, and stopped by a ratchet.

The brace *f* may be fastened by an eyebolt or a quadrant-flange and sheaves on end of brace, to admit of turning.

Having thus described my invention, I claim—

The sheer-blades A A′, pivoted on the center, and operated by means of rods *d* or *f*, connected to the wooden bar B, having rack-bar B′, and the cog-wheel or lever C, substantially as shown.

In testimony that I claim the foregoing I have hereunto set my hand this 30th day of September, 1876.

EDWARD HENNEBERY.

Witnesses:
THOS. F. FRAWLEY,
MAT. O'MEARA.